(12) United States Patent
Saavedra

(10) Patent No.: US 10,033,248 B1
(45) Date of Patent: *Jul. 24, 2018

(54) APPARATUS AND METHOD FOR GENERATING POWER USING INERTIA

(71) Applicant: LOOK FOR THE POWER, LLC, Irmo, SC (US)

(72) Inventor: John A. Saavedra, Irmo, SC (US)

(73) Assignee: LOOK FOR THE POWER, LLC, Irmo, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/726,529

(22) Filed: Oct. 6, 2017

Related U.S. Application Data

(63) Continuation of application No. 15/471,008, filed on Mar. 28, 2017, now Pat. No. 9,812,928.

(51) Int. Cl.
| | |
|---|---|
| *H02P 9/04* | (2006.01) |
| *F03B 13/00* | (2006.01) |
| *H02K 7/18* | (2006.01) |
| *B60L 11/18* | (2006.01) |
| *B60L 11/00* | (2006.01) |
| *F02D 41/12* | (2006.01) |

(52) U.S. Cl.
CPC ............ *H02K 7/1853* (2013.01); *B60L 11/00* (2013.01); *B60L 11/002* (2013.01); *B60L 11/1803* (2013.01); *B60L 11/1812* (2013.01); *F02D 41/12* (2013.01); *Y02T 10/7005* (2013.01)

(58) Field of Classification Search
CPC .............................. B60L 11/00; B60L 11/1812
USPC .......................................................... 290/54
See application file for complete search history.

(56) References Cited

U.S. PATENT DOCUMENTS

2009/0229902 A1* 9/2009 Stansbury, III ........ B60K 25/10
180/165

* cited by examiner

*Primary Examiner* — Tulsidas C Patel
*Assistant Examiner* — Thomas Quigley
(74) *Attorney, Agent, or Firm* — Shumaker, Loop & Kendrick, LLP

(57) ABSTRACT

The invention is an apparatus for generating power using inertia of a load in a moving vehicle. The apparatus includes a vessel having a volume that is capable of an expansion and a contraction, and containing a fluid under a pressure. The fluid is released from the vessel as a force is exerted by the load of the vehicle against the vessel. The apparatus includes a reservoir, operably connected to the vessel by fluid conduit. The reservoir contains the fluid under pressure until an optimum pressure is reached at which point the reservoir releases the fluid to a power generator. The power generator then generates electrical power. Excess fluid released from the power generator then returns to the vessel.

6 Claims, 5 Drawing Sheets

APPARATUS AND METHOD FOR GENERATING POWER USING INERTIA

CROSS REFERENCE TO RELATED PATENT APPLICATIONS

This application is a continuation of, expressly incorporates by reference, and claims the benefit of and priority to co-pending United States Application having Ser. No. 15/471,008 filed on Mar. 28, 2017, which itself is a continuation of United States Application having Ser. No. 14/607,209 filed on Jan. 28, 2015, now U.S. Pat. No. 9,637,013 to which this application also claims priority. The contents of application Ser. Nos. 15/471,008 and 14/607,209 are herein expressly incorporated by reference in their entireties.

TECHNICAL FIELD AND BACKGROUND OF INVENTION

The invention relates generally to the field of power generation. More particularly, the invention relates to the field of generating power and electricity utilizing inertia of a moving vehicle.

Vehicles have been traveling on roadways and on open ground since the advent of the wheel thousands of years ago. Vehicles provide an efficient means of moving a load. Motorized vehicles, powered by internal combustion engines and the like, are of more recent invention and include vehicles for moving loads. Of still more recent advent are electric and hybrid electric vehicles.

No matter the vehicle type, whether for personal transportation, mass transportation, public transportation, freight transportation, recreation, or racing and the like, vehicles are designed to haul a load, whether a single person or many tons. The load carried by the vehicle can take on many forms. As used herein, "load" may mean a person, or a spare tire, a battery, a fuel tank, freight, and the like. The term load further encompasses portions of the vehicle itself such as passenger seats and even portions of the body of the vehicle which is carried by the frame of the vehicle. Particularly in the latter example, vehicles can be characterized by their sprung and unsprung portions. As used herein, unsprung may include components such as the wheel axles, wheel bearings, wheel hubs, tires, and a portion of the weight of driveshafts, springs, shock absorbers, and suspension links. Accordingly, the sprung portions would include portions of the vehicle positioned above the unsprung portions such as a cabin or passenger compartment. In this way, load may also include the sprung weight of the vehicle.

Many motorized vehicles rely on a battery to start an engine or to power on-board system components. Electric and hybrid electric vehicles especially rely on batteries to directly power the vehicle. There are a large variety of chemical and mechanical batteries used by vehicles. Batteries, though technically storing energy in a form other than electricity, effectively serve the function of providing electricity to the vehicle by converting the stored energy into electricity.

The batteries in vehicles may be charged by many different methods. Batteries may be charged by function of an internal combustion engine by translation of an alternator or generator. Batteries may be charged by wired connection to a power grid or other charging station. Batteries may be charged by photovoltaic cells or by regenerative braking. Each of these methods converts energy from another course into energy to be stored in the battery. For instance, in the case of the internal combustion engine, the energy from the fossil fuel is converted. In the case of regenerative breaking, kinetic energy from the moving vehicle is transferred to a battery as the vehicle is slowed. In the case of the wired connection, energy from wind, nuclear, oil, gas, solar, hydroelectric, coal power and other such generating facilities may be transferred to the vehicle's battery.

Because fossil fuels are becoming more scarce and/or more expensive, and also because of environmental concerns, there is a need in the art for vehicles that are powered by electric or hybrid-electric motivation. Accordingly, there is a need in the art for means of generating electric power for vehicles and automobiles that does not rely on fossil fuels and reduces dependency on connection to a power grid in order to power a vehicle or to charge a battery, or both.

SUMMARY OF THE INVENTION

Therefore, it is an object of the present invention to provide a new and improved means of charging a battery of a vehicle and providing electric power to a vehicle. It is a further object of the present invention to provide a charging means that does not require fossil fuels or direct connection to a power grid. It is a further object of the present invention to provide a means of powering a vehicle and/or charging a battery that utilizes the load carried by a moving vehicle, including the sprung mass. It is still a further object of the present invention to provide an apparatus for powering a vehicle or charging the battery of a vehicle that utilizes the inertia and the movement of the load carried by the vehicle as the vehicle stops, starts, ascends, descends, turns, and rounds corners.

These and other aspects of one embodiment of the invention are achieved by providing a power generating apparatus adapted for utilizing the inertia of a load carried by a vehicle. As the vehicle stops, starts, ascends, descends, turns, and rounds corners, due to the load's inertia, the load which has been moving (or stopped) at a constant velocity and a constant direction will resist the movement of the unsprung portion of the vehicle. The present invention captures and translates that inertia of the load into electric energy. Said another way, the sprung and unsprung masses of the vehicle respond in different ways and rates to the movements of the vehicle. For example, part of the purpose of the vehicle's suspension is to insulate and isolate the occupants from irregularities in the road. The wheels (unsprung mass) obviously move when going over a pothole, or a seam between sections of a concrete roadway, or when crossing a speed bump, but the sprung weights respond differently, if at all. The proposed arrangement will capture some of these differences in movement, both type, direction, velocity and amplitude, and convert them to electricity.

The apparatus for generating power using inertia of a load in a moving vehicle may include a vessel that has a volume that is capable of expansion and contraction when acted upon by the load in response to the unsprung portion of the vehicle. The vessel may contain a fluid under a pressure. The fluid may be released from the vessel as a force is exerted by the load of the vehicle against the vessel.

The apparatus may include a reservoir that is connected to the vessel by fluid conduit. The reservoir may be a hydraulic accumulator. The reservoir may contain the fluid under pressure until an optimum pressure is reached. The reservoir may then release the fluid when optimum pressure is reached. The apparatus may further include a power generator that is operably connected to the reservoir via fluid conduit. The power generator translates the fluid released from the reservoir into power. Alternatively, the power generator may be operably connected directly to the vessel negating the reservoir.

According to one embodiment of the invention, the vessel may be positioned in the vehicle adjacent the load carried by the vehicle. The load will be subject to moving relative the vehicle so that the movement may be captured by the vessel.

According to another embodiment of the invention, the vessel has a first volume when the vehicle is stopped or moving at a constant velocity and constant direction and a second volume when the vehicle experiences a change in velocity and direction. The change in volume causes the fluid to flow from the vessel to the reservoir and from the reservoir to the power generator when the optimum pressure is reached.

According to another embodiment of the invention, the generator may be operably connected to a battery located on the vehicle. According to such an embodiment, the power generated by the generator is an electrical power which charges the battery.

According to another embodiment of the invention, a plurality of the vessels are located on the vehicle adjacent a respective plurality of the loads.

According to another embodiment of the invention, the vessels are hydraulic cylinders and the fluid is hydraulic fluid. The power generator is a hydraulic generator.

According to another embodiment of the invention, the vessels are bags made of a polymer and the fluid is air. The polymer may be rubber. Further, the bags may have rigid sides with flexible tops and bottoms.

According to another embodiment of the invention, one of the plurality of the loads is a spare tire.

According to another embodiment of the invention, one of the plurality of the loads is a driver or passenger seat located inside the vehicle.

According to another embodiment of the invention, one of the plurality of the loads is a battery.

According to another embodiment of the invention, one of the plurality of the loads is a gas/fuel tank.

According to another embodiment of the invention, one of the plurality of the loads is the sprung mass of the vehicle.

According to another embodiment of the invention, one of the plurality of the loads is freight carried by the vehicle.

According to another embodiment of the invention, the plurality of the loads is selected from the group consisting of: a spare tire, a driver or passenger seat located inside the vehicle, a battery, a gas/fuel tank, a sprung mass of the vehicle, and freight carried by the vehicle.

In each of these embodiments, the load, whether a battery, gas tank, spare tire, etc. . . . is not rigidly fixed in place as in the prior art but is allowed freedom to move within a space defined by the vessels. Alternatively, the vessels are attached to the load and control and restrict the movement of the load. Said another way, existing, prior art vehicles generally try to lock down and secure discrete items within them, such as gas tanks, spare tires, batteries, etc. However, allowing these items some freedom of movement allows the resulting inertia to be captured. For example, the spare tire could be allowed to slide forward, backward, and side to side, within limits. The gas tank may be allowed some flexibility of motion, as opposed to being rigidly attached to the sprung mass of the vehicle's body. The battery may be mounted on a small grid of rails, allowing movement forward, backward, and sideways.

Further, according to another aspect of the invention, stopping and/or turning a moving vehicle requires the application of force to overcome the vehicle's inertia and momentum, which are finite quantities. If some of the vehicle's inertia and momentum are converted to electrical current, the vehicle may stop more quickly and in less space than it would without it. This may improve overall safety (shorter, faster stops), reduce the tendency of the vehicle to lose traction (slide or drift), and improve (reduce) tire wear, i.e., the scrubbing action of the tires against the road surface as a consequence of stopping or turning.

BRIEF DESCRIPTION OF THE DRAWINGS FIGURES

Features, aspects, and advantages of a preferred embodiment of the invention are better understood when the detailed description is read with reference to the accompanying drawing, in which.

DETAILED DESCRIPTION

The present discussion is a description of exemplary embodiments only and is not intended as limiting the broader aspects of the present invention. The following example is provided to further illustrate the invention and is not to be construed to unduly limit the scope of the invention.

Figure 1:
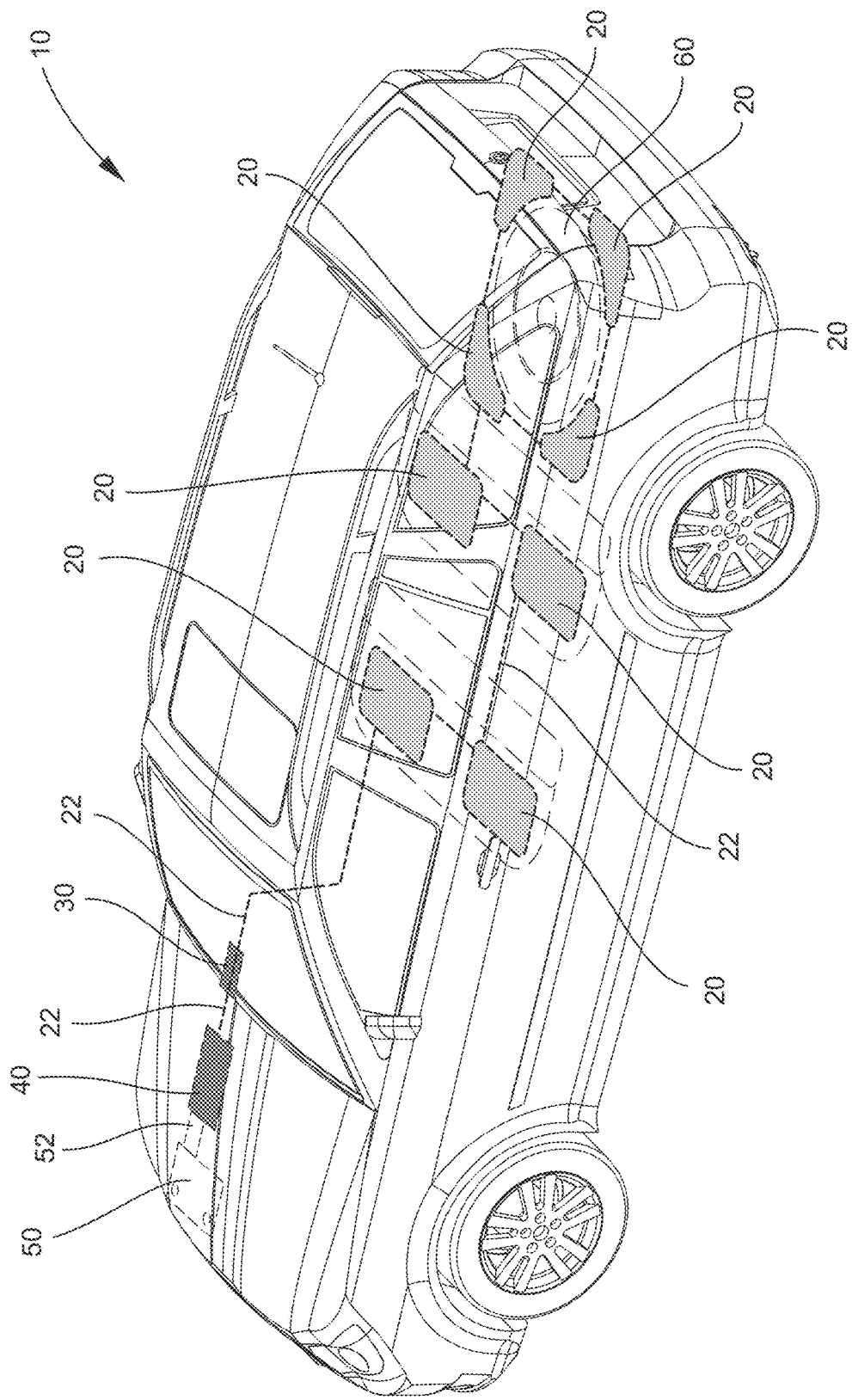
FIG. 1 is a perspective view of a vehicle with the grey areas highlighting the apparatus for generating power.
Figure 2:
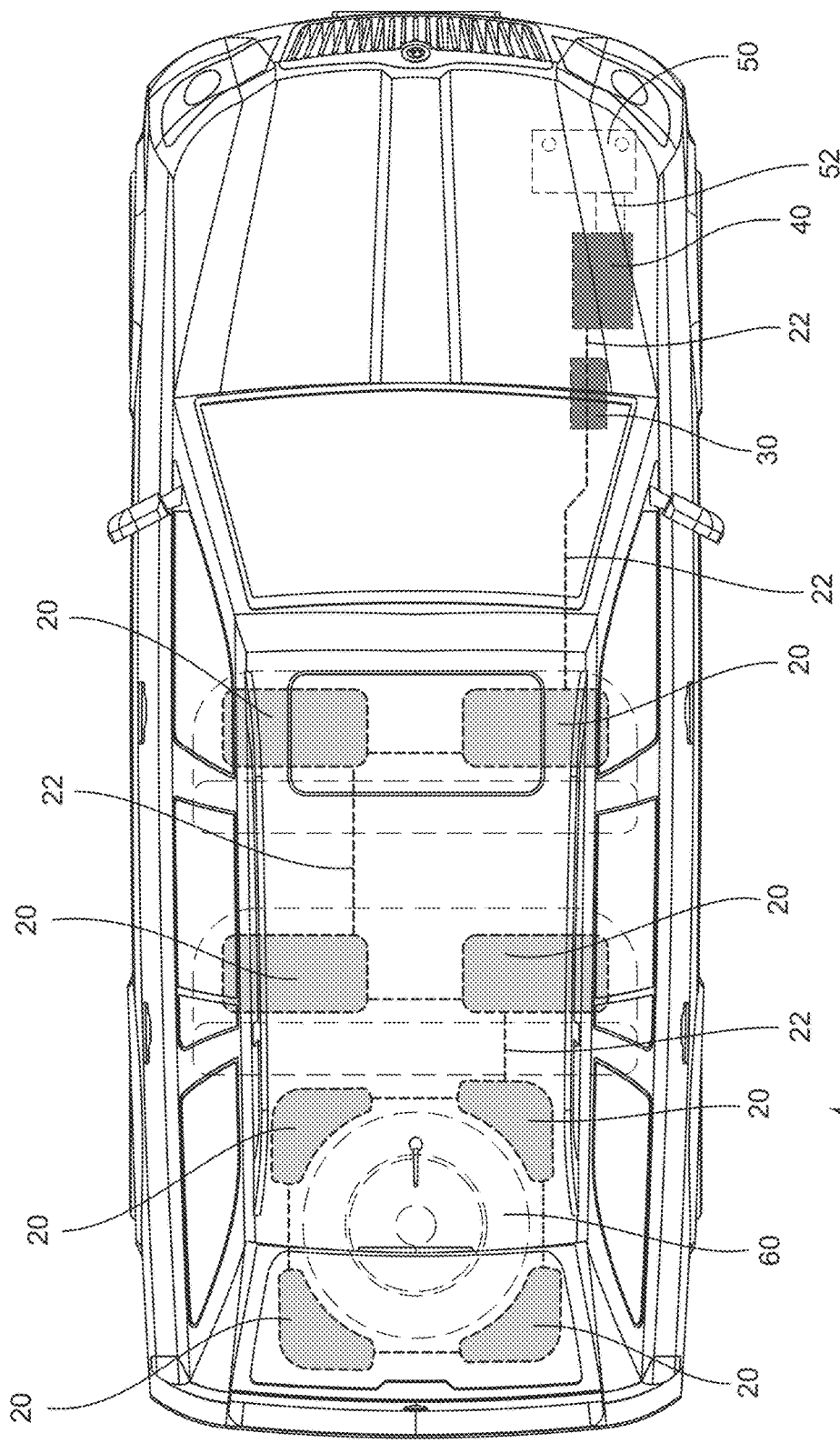
FIG. 2 is a top view of a vehicle with the grey areas highlighting the apparatus for generating power.

Referring to the drawings wherein identical reference numerals denote the same elements throughout the various views, FIGS. 1 and 2 show the apparatus 10 installed in a vehicle. Vessels 20 are positioned around the vehicle adjacent loads, such as load 60. In FIGS. 1 and 2, one such load 60 is the spare tire. Here, the spare tire, rather than being stationary, is allowed to move within the space defined by the vessels 20. The vessels 20 are each connected to a fluid reservoir 30 by fluid conduit 22. The fluid reservoir 30 is connected to fluid power generator 40 also by fluid conduit 22. The fluid power generator 40 is connected to the vehicle's battery 50 by wiring 52. In the preferred embodiment, the vessel 60 is filled with a hydraulic fluid. The vessel 60 is a hydraulic cylinder or hydraulic bag, and the power generator 40 is a hydraulic power generator.

Figure 3A:
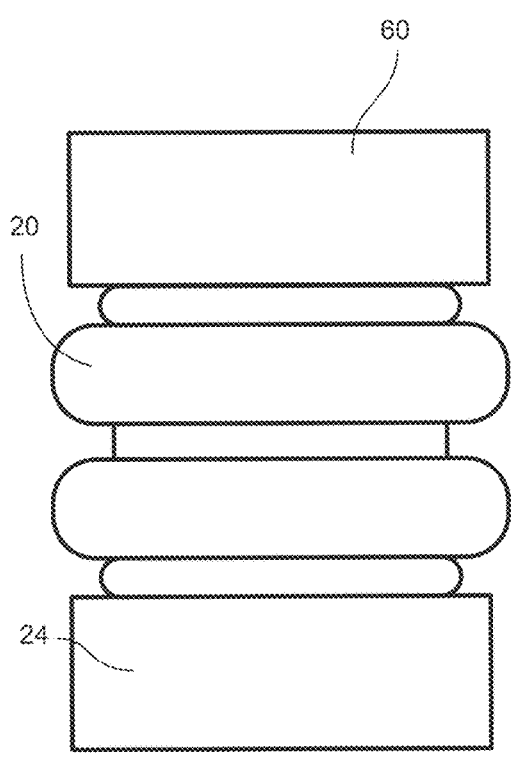
FIG. 3A is a side view of a portion of one of the vessels in the uncompressed state.
Figure 3B:
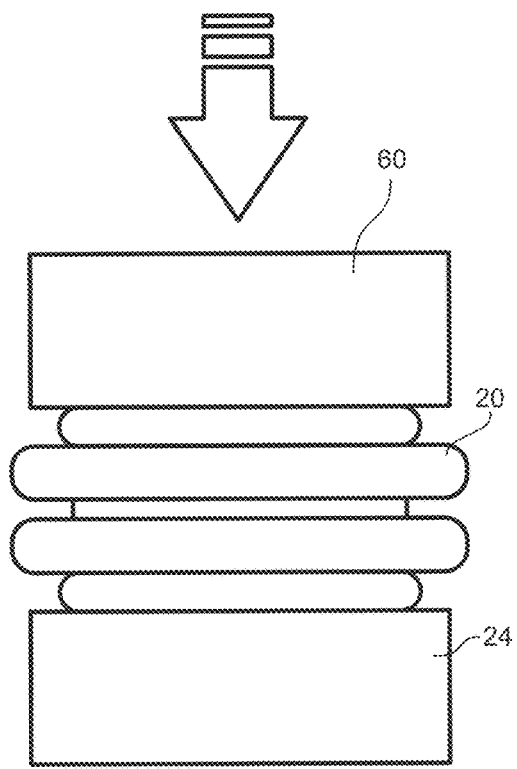
FIG. 3B is a side view of a portion of one of the vessels in the compressed state.

As the vehicle stops, starts, ascends, descends, turns, and rounds corners, due to the load's 60 inertia, the load 60 which has been moving (or stopped) at a constant velocity and a constant direction will resist the movement of the unsprung portion of the vehicle. As this resistance of the load's 60 movement occurs, the load 60 will exert a force against the vessel 20. FIG. 3A shows the vessel 20 attached to a portion of the vehicle 24 and to a load 60. The vessel 20 operates from an uncompressed state to a compressed state and may have spring properties which encourages the vessel 20 to be biased in the uncompressed state. The vessels are sealed and capable of withstanding high pressures, temperatures, and movement. FIG. 3A shows the vessel 20 in the uncompressed state where the vehicle is moving at near constant velocity in a constant direction. FIG. 3B shows the compression of the vessel 20 in response to a change in the vehicle's velocity and/or direction such as when the vehicle stops, starts, ascends, descends, turns, and rounds corners. In FIG. 3B, it can be seen that the vessel 20 has compressed against the vehicle portion 24 in response to the relative movement of the load 60 with respect to the vehicle 24. This compression of the vessel 20 will move fluid via the fluid conduit 22 to the fluid reservoir 30. As the fluid reservoir 30 builds pressure, the fluid will be released to power the fluid generator 40. Excess fluid is then returned to the vessels 20 via additional fluid conduit 22. As the vehicle travels, this fluid transfer cycle will continue, with the vessel 20 alternately expanding and contracting in response to movement of the load 60 relative the vehicle against the vessel 20. The fluid will be cycled through the system with the fluid power generator 40 providing electrical power to the battery 50.

Figure 4A:
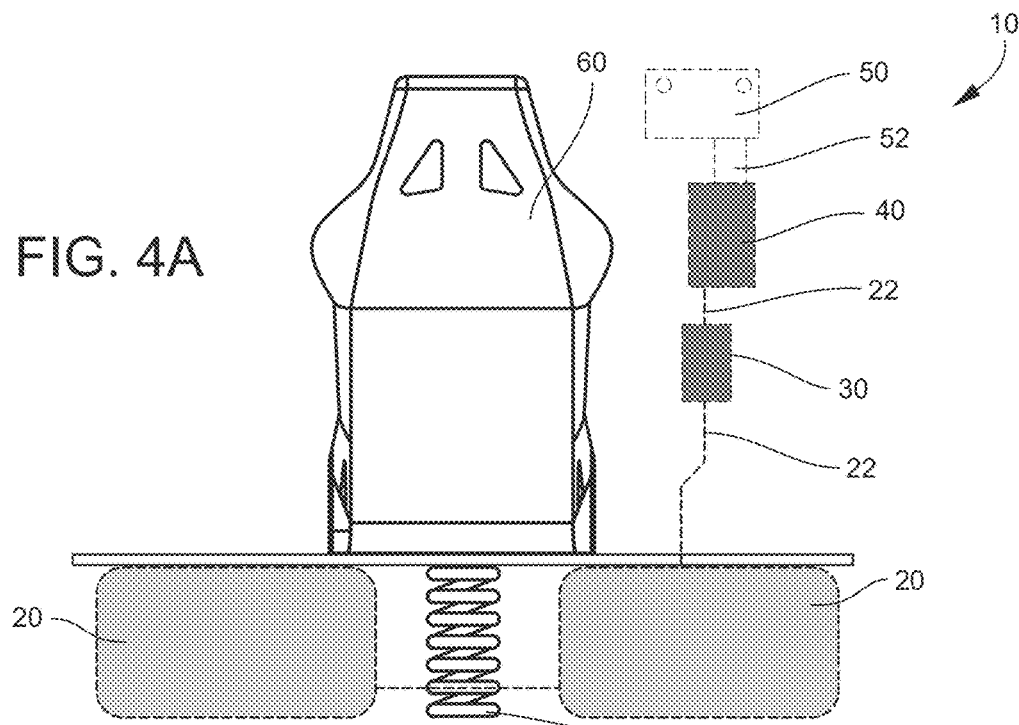
FIG. 4A is a view of a seat of a vehicle with two vessels placed beneath the seat in the uncompressed state.
Figure 4B:
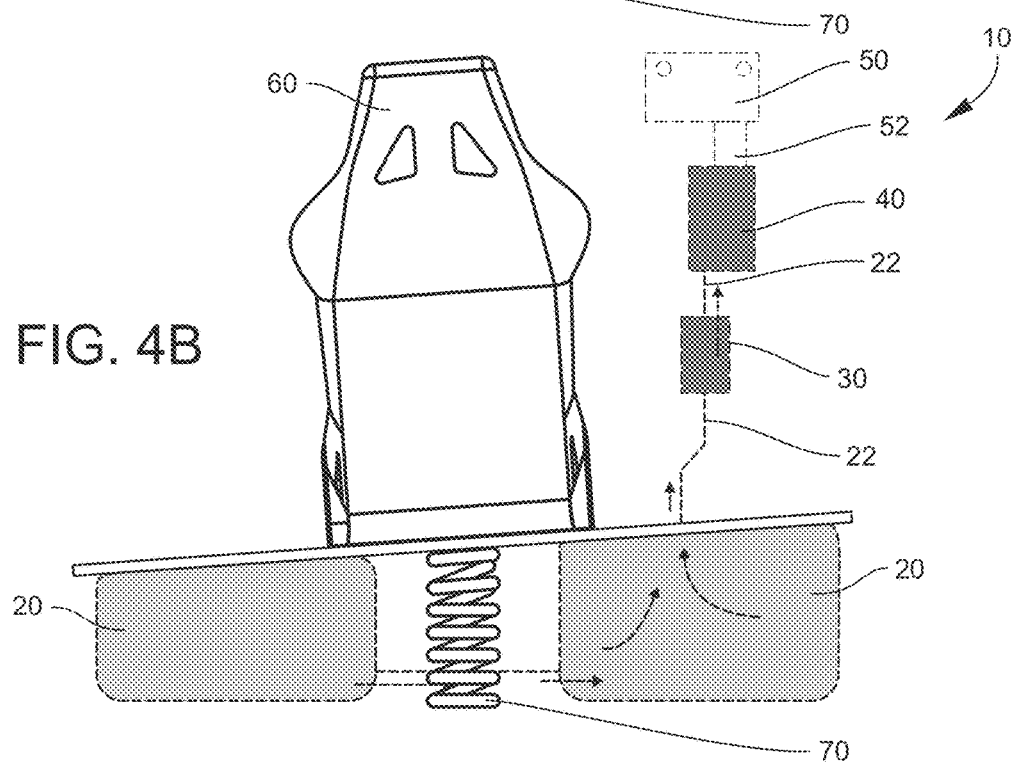
FIG. 4B is a view of a seat of a vehicle with two vessels placed beneath the seat, highlighting the compression and expansion of the vessels as the vehicle rounds a corner.

FIGS. 4A and 4B provides another exemplar of one manner in which the apparatus 10 may be deployed. In FIG. 4A, a pair of vessels 20 are deployed beneath a seat 60 which is the load of a vehicle. The seat 60 may be mounted to a spring 70 both to provide cushion to a passenger and also to aid in returning the vessel 20 to the uncompressed state. The vessels 20 of FIG. 4A are in the uncompressed state so that the vehicle is either stopped or traveling in a constant velocity at a constant direction. FIG. 4B shows the load 60 has shifted relative the vehicle as the vehicle has turned or rounded a corner. The load 60 thus leans to the left compressing left vessel 20 and expanding right vessel 20. The respective compression and expansion causes fluid to travel from the fluid vessels 20 to the fluid reservoir 30 via the fluid conduit 22. As the pressure builds in the fluid reservoir 30, fluid will be release at a predetermined pressure into the fluid generator 40 via the fluid conduit 22.

Allowing the seats 60 to swivel and pressurize the vessels 20 on which the seats 60 rest in response to stops, starts and the like may serve to mitigate and reduce the movements of the occupants, resulting in a smoother ride with less motion and body roll. For example, FIG. 4A, minus the spring and vessels, represents the current state of car seats rigidly attached to the floorboards of the car. In a curve, if the car body rolls 4 degrees, for example, off of vertical, the seat 60, and its occupant (not shown), also experience 4 degrees of roll. However, in 4B, the floorboards may roll 4 degrees away from vertical, but the seat 60 may roll only 2 degrees, with the remaining inertia serving to compress one of the vessels 20 on which it rests. This may serve to increase rider comfort and reduce motion sickness while generating power at the same time.

Figure 6:
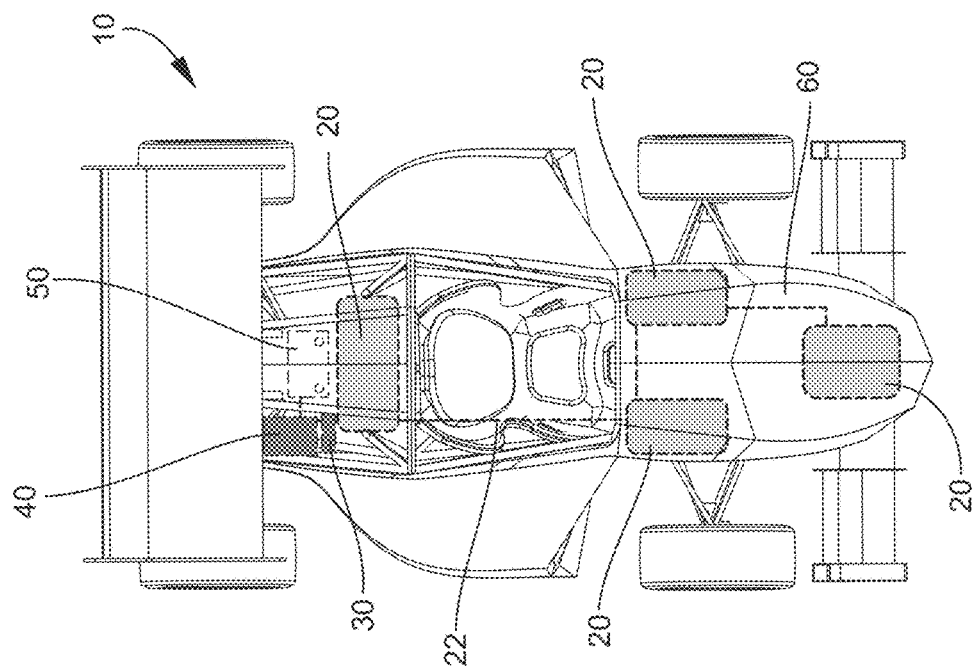
FIG. 6 is a top view of a vehicle showing the apparatus for generating power positioned around the sprung portion of the vehicle.
Figure 5:
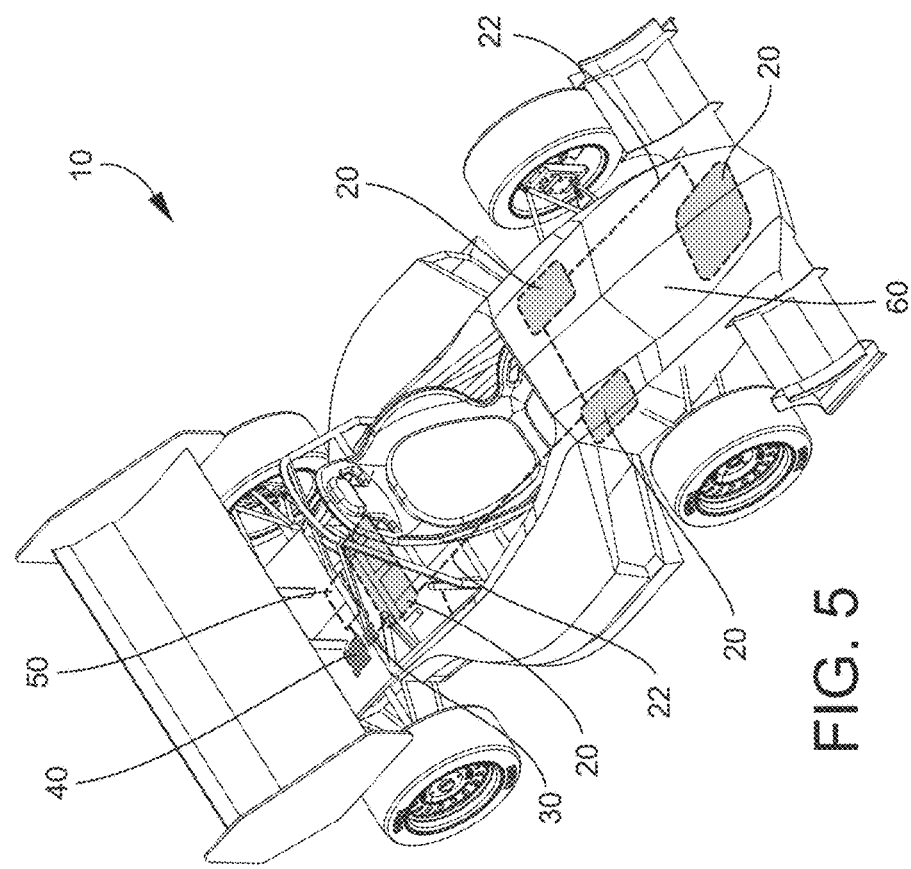
FIG. 5 is a perspective view of a vehicle showing the apparatus for generating power positioned around the sprung portion of the vehicle.

FIGS. 5 and 6 show a Formula One car with vessels 20 deployed between the sprung and unsprung portions of the vehicle. The vessels 20 are capable of supporting the weight of the sprung portion of the vehicle. As the vehicle stops, starts, ascends, descends, turns, and rounds corners, the sprung portion of the vehicle will comprise the load 60. The load 60 will exert a force, relative the vehicle, against the vessels 20. This movement will result in movement of the fluid under pressure through the apparatus, that is, from the vessels 20 to the reservoir 30 to the power generator 40 and back to the vessels 20.

The foregoing has described an apparatus for generating power 10 using the inertia of a vehicle's load. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

I claim:

1. An apparatus for generating power using inertia of a load in a moving vehicle comprising:
   a vessel, located on the vehicle directly adjacent to and in physical contact with the load, having a volume that is capable of an expansion and a contraction, and containing a fluid under a pressure; and
   a power generator, operably connected to the vessel via conduit, the power generator translating the fluid from the vessel into power;
   wherein the vessel is a polymeric bag; and
   wherein the load comprises a sprung mass of the vehicle.

2. The apparatus for generating power of claim 1 further comprising a reservoir, operably connected to the vessel by fluid conduit, the reservoir containing the fluid under pressure until an optimum pressure is reached, the reservoir releasing the fluid to the power generator when optimum pressure is reached.

3. The apparatus for generating power of claim 2 wherein the vessel has a first volume when the vehicle is stopped or moving at a constant velocity and constant direction and a second volume when the vehicle experiences a change in velocity and direction, the change in volume causing the fluid to flow from the vessel to the reservoir and from the reservoir to the power generator when the optimum pressure is reached.

4. The apparatus for generating power of claim 1 wherein the power generator is operably connected to a battery located on the vehicle wherein the power generated by the power generator is an electrical power which charges the battery.

5. The apparatus for generating power of claim 1 wherein the fluid is hydraulic fluid.

6. The apparatus for generating power of claim 1 wherein the fluid is air.

* * * * *